US012664276B2

(12) United States Patent
Ezrielev et al.

(10) Patent No.: US 12,664,276 B2
(45) Date of Patent: Jun. 23, 2026

(54) MALWARE DETECTION VIA TRACING CALLS RATE TO OBTAIN FILE ATTRIBUTES

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 18/295,027

(22) Filed: Apr. 3, 2023

(65) Prior Publication Data

US 2026/0037627 A1 Feb. 5, 2026

(51) Int. Cl.
*G06F 21/56* (2013.01)

(52) U.S. Cl.
CPC .......... *G06F 21/565* (2013.01); *G06F 21/566* (2013.01); *G06F 2201/81* (2013.01)

(58) Field of Classification Search
CPC .. G06F 21/565; G06F 21/566; G06F 2201/81; G06F 21/56
See application file for complete search history.

(56) References Cited

U.S. PATENT DOCUMENTS

| | | | | |
|---|---|---|---|---|
| 10,791,133 | B2 * | 9/2020 | Shukla | G06F 21/55 |
| 10,936,717 | B1 * | 3/2021 | Herman Saffar ... | G06F 9/45558 |
| 2004/0205474 | A1 * | 10/2004 | Eskin | H04L 63/1416 713/188 |
| 2010/0229239 | A1 * | 9/2010 | Rozenberg | G06F 21/552 726/24 |
| 2018/0113638 | A1 | 4/2018 | Petersen et al. | |
| 2018/0115577 | A1 * | 4/2018 | Shukla | G06F 21/55 |
| 2018/0157834 | A1 | 6/2018 | Continella et al. | |
| 2021/0089647 | A1 * | 3/2021 | Suwad | G06F 21/552 |
| 2021/0150025 | A1 | 5/2021 | Ben-Shalom et al. | |
| 2022/0050897 | A1 * | 2/2022 | Gaddam | G06N 3/006 |
| 2024/0330461 | A1 * | 10/2024 | Ezrielev | G06F 21/566 |

FOREIGN PATENT DOCUMENTS

| | | | | | |
|---|---|---|---|---|---|
| CN | 105956468 | A * | 9/2016 | | G06F 21/566 |
| CN | 106803039 | A * | 6/2017 | | G06F 21/566 |
| DE | 102024107746 | A1 * | 10/2024 | | G06F 21/55 |

* cited by examiner

*Primary Examiner* — Jayesh M Jhaveri
(74) *Attorney, Agent, or Firm* — Workman Nydegger

(57) ABSTRACT

The system call rates associated with system calls made by applications or processes operating in a user space are determined and tracked. A malware detection engine, hidden from the user space and operating in the kernel space, is configured to identify anomalous system call rates. A malware process can be identified based on its anomalous system call rate. Once the malware process is identified, protection operations can be performed in the computing system.

19 Claims, 7 Drawing Sheets

MALWARE DETECTION VIA TRACING CALLS RATE TO OBTAIN FILE ATTRIBUTES

FIELD OF THE INVENTION

Embodiments of the present invention generally relate to a computing forensics system. More particularly, at least some embodiments of the invention relate to systems, hardware, software, computer-readable media, and methods for protecting data from threats including cyber threats.

BACKGROUND

Most entities rely on computing systems. These computing systems include applications and their data. Hospitals, for example, have applications that require/use/generate data related to patients, medicines, procedures, and the like. Much of this data is confidential. Airlines rely on applications and data to manage flights, passengers, employees, and more.

These entities exert substantial efforts to ensure that their data is available when needed. These efforts include generating backups of the production systems/data. Generating backups helps ensure that in the event of data loss, the production systems can be restored, and operations can resume.

Data corruption or loss, however, can occur in different ways. The loss of a disk drive due to hardware failure, for example, can usually be quickly resolved. The loss of data (e.g., inability to access the data) due to malware or other cyber threats can be much more problematic.

Malware that infects a production system, for instance, can cause severe problems in the entity's operations as the data may not be accessible. In addition to infecting production systems, malware may also infect backups. Recovering from malware can be complicated, difficult, and costly due to the potentially unknown effects of the malware. Further, the delay associated with recovering the production system may be further delayed when law enforcement or insurance companies are involved.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection systems and data protection operations. More particularly, at least some embodiments of the invention relate to systems, hardware, software, computer-readable media, and methods for detecting and/or responding to malware and other cyber-attacks.

In general, example embodiments of the invention relate to data protection operations including, but not limited to, data protection operations, backup operations, snapshot operations, restore/recover operations, point-in-time backup/recover operations, malware response operations, malware evaluation operations, malware detection operations or the like or combinations thereof.

The term malware as used herein and by way of example only, may refer to ransomware, viruses, rootkits, spyware, adware, trojans, worms, phishing attacks, or other unwanted software or cyber-attacks. Malware may also be referred to as a computing process or application.

Embodiments of the invention relate to a forensic engine, or a forensics kit configured to evaluate, detect and/or respond to malware. When malware is detected in a production system (or in a backup), the forensic engine may perform a snapshot or other backup of the production system. The snapshot, which includes the malware, is an infected snapshot and may be deployed to a forensics environment such that the forensic engine can attempt to learn how the malware operates, how the production system was infected, or the like. This is described in U.S. Ser. No. 17/937,882 filed Oct. 4, 2022, which application is incorporated by reference in its entirety. The forensic engine allows the malware to operate in an observed manner such that operational characteristics of the malware can be learned and evaluated. This may include determining how and when files are altered (e.g., deleted, changed, encrypted), how and where data is sent by the malware, how the malware spreads, how the malware responds to anti-malware software, how the malware tries to avoid detection, how the malware infects backups, and the like.

This may also include learning aspects of how the malware performs system calls. This may include learning the timing of system calls, the type of system calls, the pattern in which system calls are generated, whether the system calls are periodic or more random, or the like. Embodiments of the invention allow the forensic engine to learn these operational characteristics or other behavior.

Figure 1:
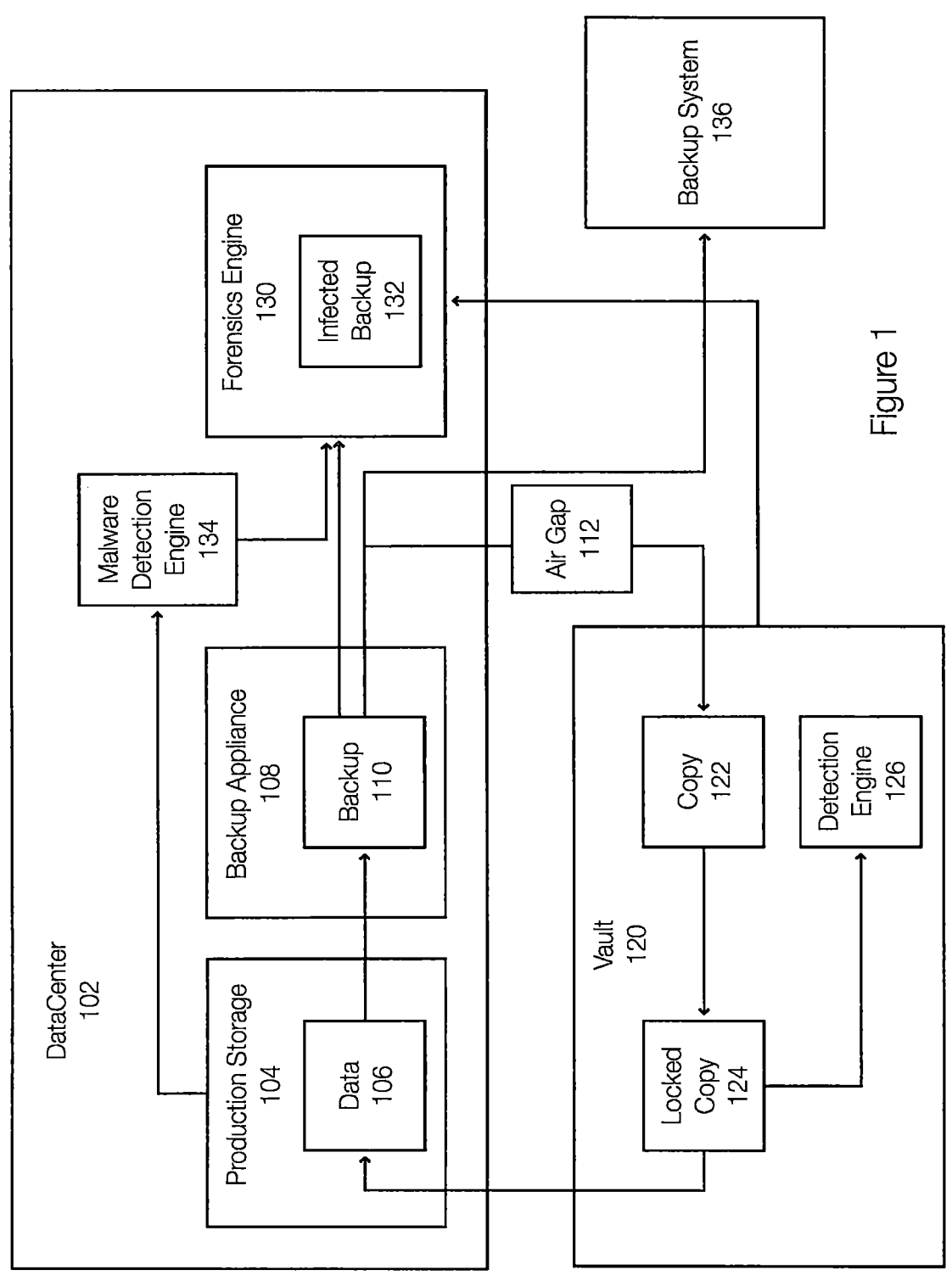
FIG. 1 discloses aspects of a forensic engine or kit configured to perform data protection operations including learning operations performed by a malware and responding to the malware.

FIG. 1 discloses aspects of a forensic engine configured to perform data protection operations including malware related operations such as malware detection operations. FIG. 1 illustrates a datacenter 102 that includes production storage 104, which stores production data 106. The datacenter 102 may also host applications associated with the data 106. The production data 106 may include data required or accessed by users, applications, or the like. The data 106 is generally referred to herein as files, but may include files, objects, blocks, a database, emails, images, videos, documents, spreadsheets, presentations, or the like or combination thereof. These different types, formats, and structures may be referred to as files herein.

Although FIG. 1 illustrates production storage 104 of a datacenter 102, the production storage 104 may be an on-premise storage system, an edge system storage, a cloud-based system or the like or combination thereof. The production storage 104 may include storage devices such as hard disk drives.

A backup appliance 108 is configured to generate and store backups of the data 106 (and/or applications), represented as the backup 110. The backup 110 may be or include a full backup, a synthetic backup, incremental backups, snapshots, or the like. The backup appliance 108 may be a virtual appliance or a physical appliance. The backup appliance 108 may coordinate with other backup appliances at remote locations. This allows backups to be stored remotely.

More generally, the backup appliance 108 may protect data, applications, or the like. The backup appliance 108 may transmit the backup 110 to a vault 120, which may be protected by an air gap 112 controlled by the vault 120. This allows a copy 122 (e.g., a backup) of the data 106 to be stored in the vault 120 only when a connection is available (e.g., the air gap 112 is configured to allow communications). After ingestion into the vault 120, the copy 122 is locked to generate a locked copy 124. The locked copy 124 is immutable in one example. The vault 120 may be created in the datacenter 102 or in another location that is remote from the data 106 and/or the backup appliance 108. In other examples, backups may be stored in storage systems that are not protected by an air gap mechanism. For example, the backup appliance 108 may regularly transmit backups to a backup system 136 in the cloud or other location.

During a recovery operation, the data 106 may be recovered from the locked copy 124 (or other backup in the vault 120) or from the backup system 136. In some examples, the data 106 may be recovered from the copy 122 if necessary. In one example, the backup 110 may be a namespace that is backed up to a namespace in the vault 120. The backup 110 may be transmitted to a namespace in the vault 120 as the copy 122. Next, the copy 122 may be copied to another namespace and retention locked, which results in the locked copy 124.

The air gap 112 may not be required but provides a more secure backup environment. Once the locked copy 124 is generated and retention locked, the immutability is guaranteed in one example. For example, the locked copy 124 is secure from attack vectors that adversely impact backups because the vault 120 may not be accessible, due to the air gap 112, which is controlled from inside the vault 120 in one example.

In one example, the vault 120 may be a target site configured to store backups received from the backup appliance 108. The vault 120 may be associated with a corresponding appliance that may be configured to store the backups in the target site and also perform restore or recover operations. In one example, the air gap 112 is not present and the value 120 may simply represent backup storage that stores backups received from the backup appliance 108.

The production storage 104 (or more generally the production system) may be associated with a malware detection engine 134. When the malware detection engine 134 detects malware in the production storage 104 or in the production system, the malware detection engine 134 may trigger the forensic engine 130 and/or perform other protective operations. The forensic engine 130 may be triggered in another manner or may include the malware detection engine 134.

When triggered, the forensic engine 130 may generate a snapshot (e.g., a point-in-time snapshot) or backup of the production system, which is illustrated as an infected backup

132. The infected backup 132 may be taken from the data 106, may be a PiT copy generated from the backup 110, or the like. In this example, the infected backup 132 may represent different types of backups.

Figure 2:
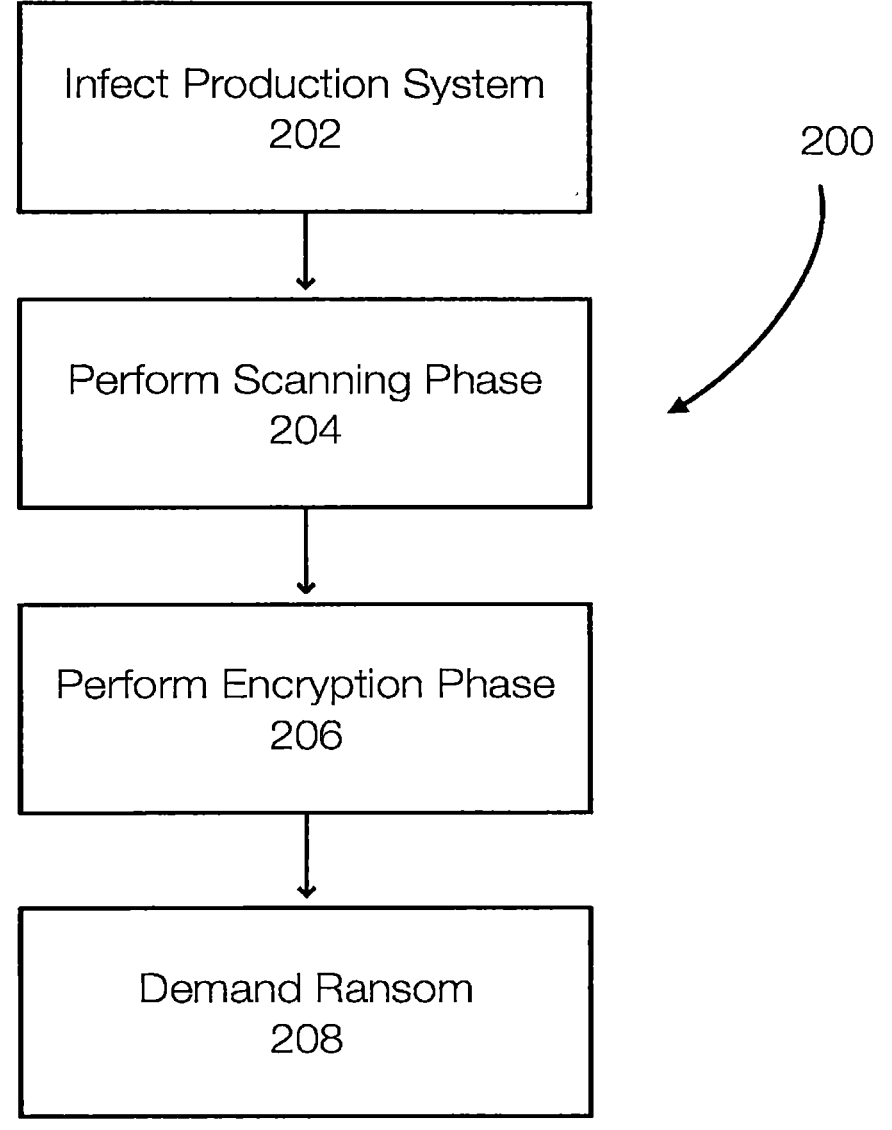
FIG. 2 discloses aspects of operational phases of a malware application or process.

FIG. 2 discloses aspects of malware operations. For example, ransomware is an example of malware that is configured or designed to block/prevent users from accessing their data until a ransom is paid. Ransomware is prevalent and is a significant concern for users everywhere. Embodiments of the invention are directed to detecting malware such as ransomware in real time or near real time in order to prevent or mitigate damage to the production system. Embodiments of the invention may be configured to detect malware before the malware begins causing harm, such as encrypting or corrupting files.

As illustrated in the method 200, malware, such as ransomware, may infect 202 a production system. Malware may gain access to the production system in different manners such as when a user visits an infected website, opens a malicious attachment or email, sends login information to a phishing site, or the like.

Once the malware gains access to or infects a production system, the malware may operate in phases. In a simple example, malware such as ransomware may simply begin encrypting data or files until stopped. This is possible because encryption functionality is often part of an operating system. Thus, the ransomware only needs to access the files, encrypt the files with an attacker-controlled key, and replace the original files with the attacker controlled encrypted files.

Many malware or ransomware variants may be more cautious in selecting files to encrypt or may generate a plan prior to encrypting the data. This may be performed to ensure system stability. More specifically, the malware may perform a scanning phase 204. A scanning phase 204 may allow the malware to identify files that appear to have higher value, select files to encrypt, generate a mapping of files to encrypt, or the like. During this or other phases of operation, some malware may delete backup and shadow copies of files to make recovery without the decryption key more difficult. The scanning phase may also include attempts to infect other computing systems or the like. For example, a malware may gain access to a production data system and spend time trying to access an accounting system or spread to other unrelated computing systems.

Once the malware has scanned the production system and completed the scanning phase, an encryption phase 206 may be performed. The encryption phase 206 may be representative of various forms of attack. As previously stated, this may be performed using an attacker-controlled key and encryption functionality of the operating system. In another example, the malware may corrupt data (e.g., partially delete, partially overwrite) in the encryption phase. Once the files are encrypted or corrupted, a ransom may be demanded 208. The malware may only encrypt the targeted files or perform other operations in the infected computing system.

The scanning phase performed by malware may include numerous attempts to obtain file attributes. Malware may make multiple attempts to multiple files and/or multiple attempts to individual files. More specifically, malware may access a file one or more times. Files that the malware views as valuable or files that the computing system believes would be valuable to the malware may be accessed one or more times. This is often achieved using various types of system calls (calls to the operating system). A typical system call used to discover file attributes is a read call, which allows the malware to read the file that is the subject of the system call.

Malware performs system calls to obtain file attributes, by way of example, in order to determine a value of the file. Attributes, as used herein and by way of example only, may refer to various aspects of a file. Attributes may include metadata such as file size, creation date, time of last access, storage location, privileges, file type, or the like. Attributes may also include the content of or information about the content of a file. For example, the malware may attempt to determine whether the file contains financial, personal, or confidential information or the like. Attributes such as whether the file contains older or newer information may also be examples of attributes. The attributes may allow malware to estimate how often a file is accessed and the risk of discovery should the file be encrypted. System calls can be used to obtain other file attributes such as information about databases including adjacency information, relationship metadata, column information, row information, or the like.

Reading a file to obtain the file's attributes may allow the malware to categorize the file as financial, confidential, business-purpose, or the like. These categorizations may allow the malware to, in effect, place a value on the file. Files that are deemed most valuable are likely to result in higher ransoms. For example, malware attacking a hospital may place higher value on patient data, which may be important for patient treatment in an effort to negotiate a higher ransom. A hospital's human resource files may have a lower value from this perspective. The attributes may also allow the malware to generate an encryption plan. For example, older or less frequently accessed files may be encrypted first in an attempt to delay discovery of the malware.

Embodiments of the invention monitor system calls in order to determine whether a process is or may be a malicious process. Anomalies in the number of system calls performed by a process may suggest that the process is a malicious process.

During the scanning and/or encryption phases of a malware application or process, the malware may generate system calls to determine attributes of files in the computing system. The scanning phase may require the malware process to generate a large number of system calls. When these anomalous system calls are detected, a malware detection engine may determine that the process responsible for the system calls may be a malicious process that is preparing to perform additional actions or harm in the computing system. This allows a protective action to be performed when the malware process is detected. This may advantageously occur prior to any files being encrypted or corrupted or otherwise manipulated by the malware process. In other words, embodiments of the invention may be able to stop malware during the scanning phase.

Embodiments of the invention thus relate to detecting malware in a computing system and to detecting malware operations based on the operations/actions/calls performed by the malware in the computing system. More specifically, an attack can be stopped/mitigated by detecting a malware process during a scanning phase prior to an encryption phase.

For example, a malware process may issue systems calls (e.g., read file) to read a file to determine or evaluate the contents of that file. More generally, this is an attempt to determine the attributes of the file such that a value of the file can be determined or estimated. A file containing social security numbers and birthdates or banking information or financial information, for example, may be considered more valuable than a file containing a description of the business or general business goals or data that is already public.

Using the file attributes that are discovered using system calls, the malware can formulate an attack plan.

Figure 3:
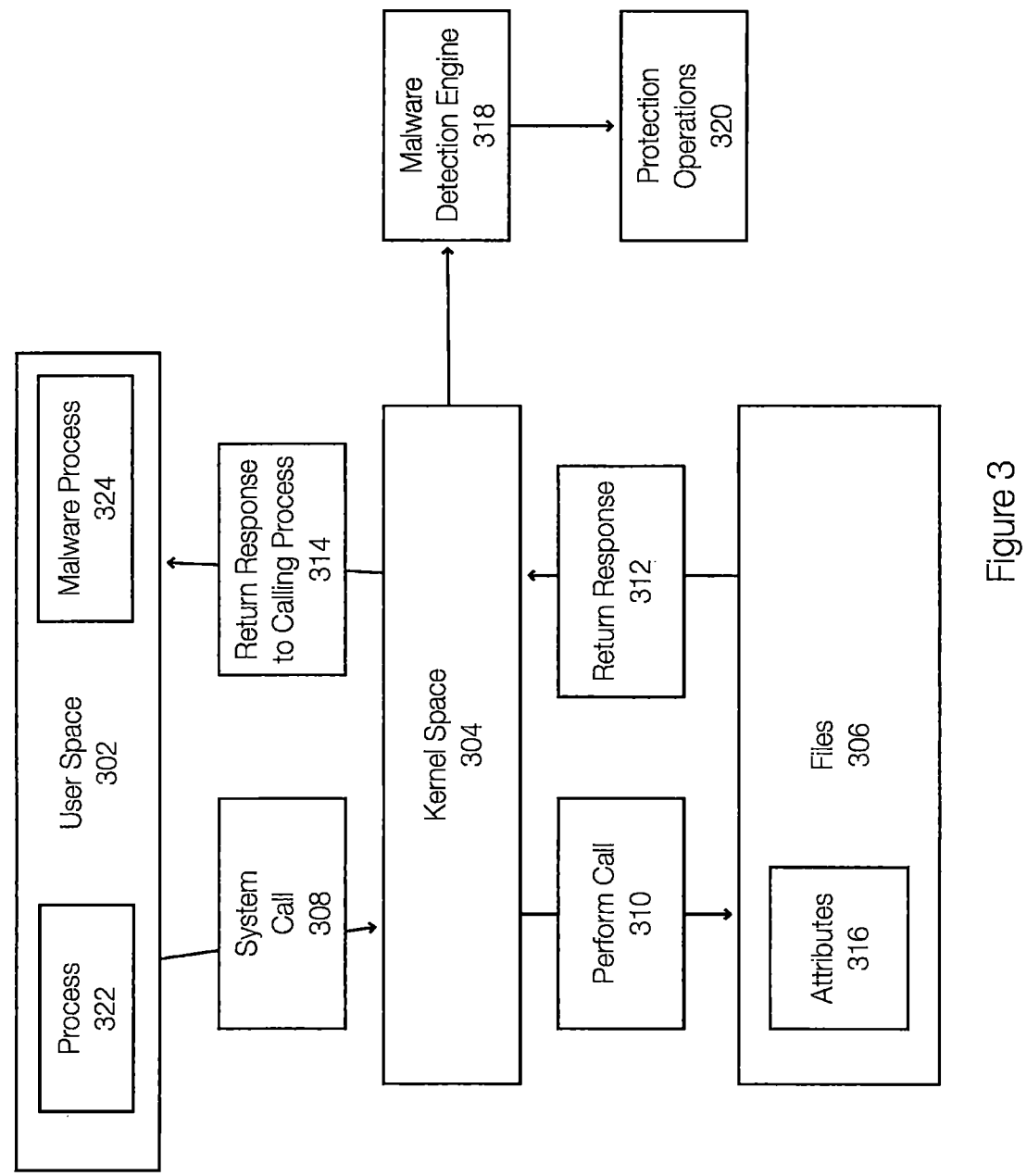
FIG. 3 illustrates aspects of a malware process operating in a computing environment.

FIG. 3 illustrates aspects of a malware process operating in a computing environment. FIG. 3 illustrates an application or user space 302 and a kernel space 304, which are both aspects of an operating system or of a computing system. In general, the user space 302 includes memory in which application software or processes execute. The kernel space 304 is reserved for the operating system, device drivers, or other privileged processes and generally has control over the computing system.

Malware such as the malware process 324 operates in the user space 302. Malware may also operate in the kernel space and embodiments of the invention may also be performed with respect to malware operating in the kernel space. The process 322, which is not malware, also operates in the user space 302. Embodiments of the invention may operate in the kernel space 304. Because the kernel space 304 is separated or hidden from the user space 302, this allows the malware process 324 to be detected efficiently in the kernel space 304 in a manner that may not alert the malware process 324.

As illustrated, processes in the user space 302 may issue system calls 308, which are received at the kernel space 304. The kernel space 304 performs 310 the system calls with respect to the files 306. For example, the process 322 may issue a system call to read one of the files 306. The malware process 324 may similarly issue a system call to read one of the files 306.

The call is performed 310 in the kernel space and a response is returned 312 to the kernel space 304, which subsequently returns 314 the response to the calling process or application.

The kernel space 304 may include a malware detection engine 318 that is configured to monitor system calls made my processes in the user space 302. The malware detection engine 318 may be configured to determine a system call rate for each of the processes operating in the user space 302. The system call rate for each of the processes may be measured with respect to a time window. For example, the call rate may be measured with respect to a 2 minute window. The size of the window can vary and may be set by default or by a user.

The malware detection engine 318 can track the number of system calls to identify system call rates for each of the processes. Consider time windows of 10 and 2 minutes. If the process 322 issued 20 system calls in the last 10 minutes, the system call rate is 2 system calls/minute. If the process 322 issues 20 system calls in the last two minutes, the call rate may be 10 system calls/per minute. Thus, the same process 322 may have different call rates that depend on the size of the window.

The size of the window may be selected using, in one example, information about known malware and known malware behaviors. If, for example, the average call rate of a single malware or of a group of related malware variants is about 50 system calls per minute, the malware detection engine 318 may identify a process as a malware process when the call rate is the same as or similar to the historical call rate of known malware processes.

In another example, the malware detection engine 318 may compare the call rates of processes operating in the user space 302. If the system call rate of a process is not comparable to the system call rates of other processes, that process may be a malware process and may be treated as a malware process.

In another example, normal system call rates may be established or determined for a computing system using historical data. When a process has a system call rate outside of the normal system call rates (e.g., more than one standard deviation), the process may be treated as a malware process and protection operations 320 may be performed. The protection operations 320 may include blocking the malware process 324, terminating the malware process 324, quarantining the malware process 324, or the like. The system call rates can also be based on file categories. For example, the computing system may attempt to label files in a manner that malware would label files (e.g., valuable or not valuable). Many different categorizations are possible. This allows a system call rate for a process to be determined with respect to each category. As a result, a process may be associated with an overall system call rate and/or category system call rates. A blended system call rate could also be generated.

Figure 4:
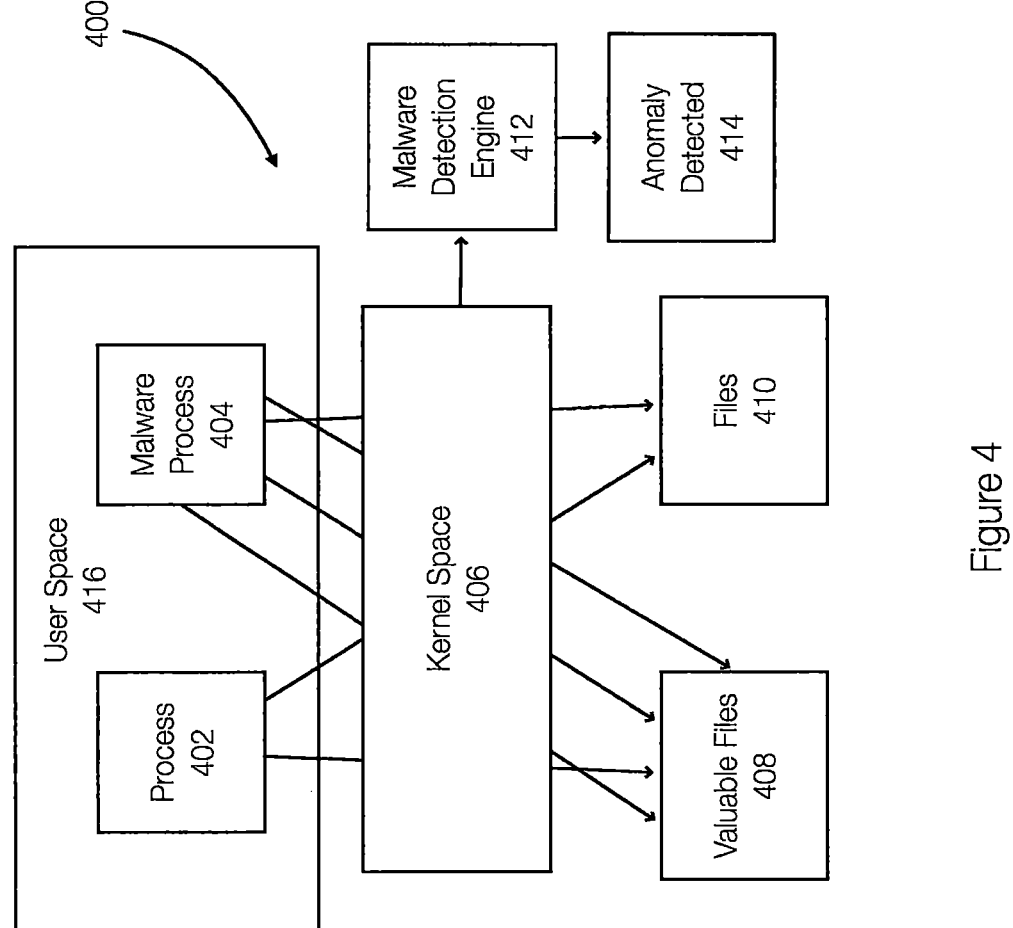
FIG. 4 discloses aspects of detecting malware in a computing environment.

FIG. 4 discloses aspects of detecting malware in a computing environment. FIG. 4 illustrates a process 402 and a malware process 404 operating in a user space 416 of a computing system or environment. In this example, the files have been labeled as valuable files 408 or not labeled. The valuable files 408 include files that the computing system or a user thereof may think are valuable to malware. In other words, a valuable file may be determined based on the presumed assumptions of the malware process 404.

The process 402 may issue system calls (represented by arrows) to the files 410 and to the valuable files 408. The malware process 404 similarly issues system calls (represented by arrows) to the valuable files 408 and the files 410. This allows the malware detection engine 412 to determine whether a process is accessing a valuable file or not and allows category specific system call rates to be determined.

For example, if the malware process 404 considers files that contain personal information or financial information to be valuable, then these types of files may be deemed to be the valuable files 408. The factors used to determine whether a file is a valuable file (e.g., attractive to malware) may include age of file, age of file contents, type of content, or the like or combination thereof. The value of a particular file may also depend on the type of entity being attacked. Valuable files in a banking computing system may be different from the valuable files of an airline company.

If the computing system 400 categorizes files as valuable/ not valuable and/or uses other categories, the system call rates monitored by the malware detection engine 412 can be determined for each category. For example, system call rates to files categorized as valuable can be monitored and compared. More generally, system call rates to file classes, file categorizations, or the like may be monitored. If an anomaly in the system call rate is detected 414, a protective operation may be performed.

Figure 5:
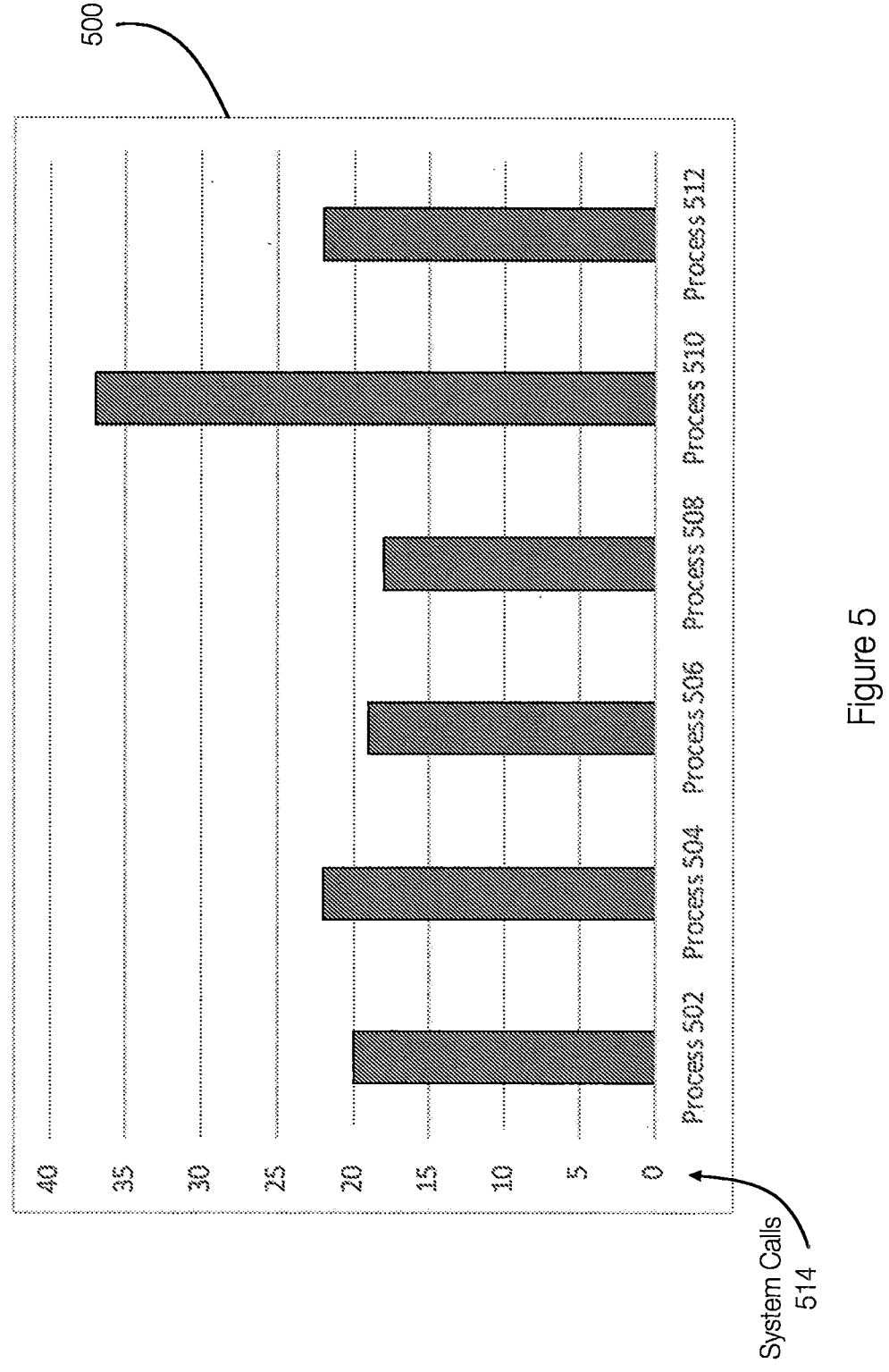
FIG. 5 discloses aspects of call rates that identify anomalous or suspicious processes in a computing system.

FIG. 5 discloses aspects of call rates that identify anomalous or suspicious processes in a computing system. FIG. 5 illustrates a graph 500 that represents information that may be stored or tracked by a malware detection engine (e.g., malware detection engine 412). The graph 500 illustrates system calls of processes 502, 504, 506, 508, 510, and 512. In this example, a time value of per minute is assumed. Thus, the Y axis represents system calls 514 performed and the X axis represents the processes that performed or issued the system calls. Because a time value is assumed, the number of system calls is also representative of a system call rate.

However, the actual system call rate may depend on the computing system and may be substantially higher or lower. In FIG. 5, the average overall system call rate is $$\text{average call rate} = \frac{20 + 22 + 19 + 18 + 37 + 22}{6} = 23.$$

The standard deviation is approximately 7.04. In this example, the process 510 is about 2 standard deviations from the mean. This is an example of identifying an anomalous process in a computing system. The malware detection engine 412 may determine that the process 510 is anomalous or malicious and perform protection operations.

More generally, data tracked (e.g., the system call rate) by the malware detection engine 412 for the process 510 does not fit with the call rates of other processes in the computing systems. The call rate of the process 510 stands out from other call rates and is suspicious.

In one example, the malware detection engine 412 may perform protection operations in an escalated manner. For example, if the system call rate for a particular process is less than one standard deviation from the mean system call rate but is also the highest system call rate, the malware protection engine may temporarily pause the process and issue an alert. Alternatively or in addition, the malware protection engine 412 may evaluate the system call rate with respect to specific classes or categories of files. If the overall system call rate of the process 510 is normal with respect to overall system call rates for other processes but too high (e.g., above a threshold call rate or statistically anomalous) with respect to system call rates of other processes accessing files in the same specific class or category of files, the malware detection engine may perform protection operations. In one example, the system call rate for a category may be weighted more heavily than an overall system call rate.

Figure 6:
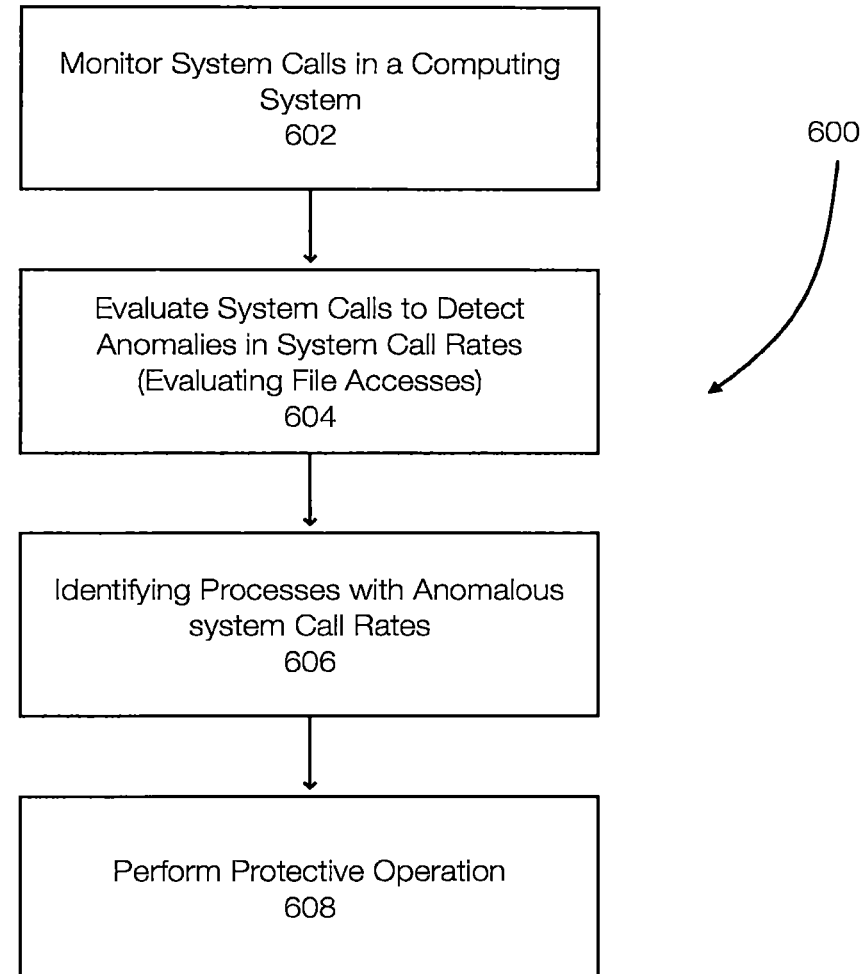
FIG. 6 discloses aspects of a method for detecting malware in a computing system.

FIG. 6 discloses aspects of a method for detecting malware in a computing system. In the method 600, system calls in a computing system are monitored 602. In one example, calls generated by applications or processes in the user space are monitored in the kernel space. This hides the malware detection from the malware processes and may prevent the malware processes from determining that they have been detected and/or taking evasive action.

The system calls are evaluated 604 to detect anomalies. More specifically, this may include determining one or more system call rates for processes operating in the user space. Call rates for all files may be determined (overall system call rate), call rates for specific classes or categories of files may be determined, or the like. Detecting anomalies may include an analysis or evaluation of multiple call rates. In some example, an average system call rate may be generated.

The system call rates can be determined in different manners. For example, system call rates can be based on multiple time windows. This may allow malware that varies their system call rate to be detected. System call rates can be predicted using machine learning models. The process of evaluating system calls may be performed continuously or periodically. Thus, system call rates may be updated over time. Alternatively, a time series of system call rates may also provide insight into anomalous system call rates.

Using the system call rates of the processes operating in the user space, processes with anomalous system call rates can be identified 606. As previously stated, anomalies in system call rates can be based on the overall system call rates, system call rates for specific categories, system call rate predictions, or the like and/or combinations thereof. Further, the analysis can be cumulative. A process that is anomalous with respect to an overall system call rate and with respect to a specific category of files may be viewed as malicious with more certainty that a process that is only anomalous with respect to the overall system call rate. Thus, a process may be deemed suspicious or malicious by considering the system call rate(s) of the process in the context of the system call rates of other processes.

In another example, a threshold system call rate may be determined and any process that exceeds the threshold system call rate may be deemed suspicious or malicious. Embodiments of the invention are configured to evaluate the system call rates from multiple perspectives when identifying which may be anomalous or an outlier.

When a process has or is associated with anomalous system call rates, protection operations may be performed 608. Embodiments of the invention allow the malware process to be detected in the kernel space or hidden from the malware process. This may allow protection operations such as remedial operations such as preventing shadow copies from being deleted, preventing writes or overwrites to other files, disabling encryption functionality, or the like in addition to protection operations such a blocking the suspected malware process. Remedial operations may prevent other malicious processes that may not be identified as malicious from causing further harm.

In addition to determining that a process is malware or is suspected to be malware based on call rates, other vectors may be used. An example of a vector is a scheme. An example of an anomalous scheme may be related to how the process is accessing files. A file that accesses the files of a computing system folder by folder and file by file in each of the folders may be anomalous. The access scheme may be to read files for a first period, stop for a second period, and then resume. Schemes that do not correspond to typical application access patterns may be deemed anomalous.

Another vector is a target list. A process that targets and access files of a specific type (e.g., .pdf or database files) may be a malware process. If malware is known to access certain types of files or files with certain attributes, a process that accesses these types or targets may be a malware process.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, malware detection operations, malware response operations, malware deployment operations, file locking operations, kill operations, file kill detection operations, or the like or combinations thereof. Further operations may include data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Power-Protect CyberRecovery and associated data protection software, and storage environments such as the Dell-EMC DataDomain or PowerProtect storage environments. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: monitoring system calls from a process operating in a user space of a computing system, determining a system call rate of the system calls issued by the process, determining that the system call rate is anomalous in the computing system, and performing a protection operation when the process is determined to be a malicious process based on the system call rate.

Embodiment 2. The method of embodiment 1, wherein the system call rate is a first system call rate for all files in the computing system or is a second system call rate for a first category of files in the computing system.

Embodiment 3. The method of embodiment 1 and/or 2, wherein the system call rate is a combination of the first system call rate and the second system call rate.

Embodiment 4. The method of embodiment 1, 2, and/or 3, further comprising identifying first files that belong in the first category of files, wherein the first category includes files viewed as valuable to the malware process.

Embodiment 5. The method of embodiment 1, 2, 3, and/or 4, wherein the first category includes files whose attributes indicate that the files include financial data, personal data, confidential data, or combination thereof.

Embodiment 6. The method of embodiment 1, 2, 3, 4, and/or 5, further comprising determining the first system call rate and the second system call rate with regard to a time window.

Embodiment 7. The method of embodiment 1, 2, 3, 4, 5, and/or 6, further comprising varying a size of the time window.

Embodiment 8. The method of embodiment 1, 2, 3, 4, 5, 6, and/or 7, further comprising determining that the process is anomalous when the system call rate exceeds a threshold system call rate.

Embodiment 9. The method of embodiment 1, 2, 3, 4, 5, 6, 7, and/or 8, further comprising determining that the process is anomalous when the system call rate is statistically anomalous in the context of system call rates associated with other processes operating in the user space.

Embodiment 10. The method of embodiment 1, 2, 3, 4, 5, 6, 7, 8, and/or 9, wherein the system calls are directed to files, databases, and/or other data types.

Embodiment 11. A method comprising: monitoring a vector associated with a process operating in a user space of a computing system, determining that the vector associated with the process is anomalous, and performing a protection operation when the process is determined to be a malicious process based on the vector being anomalous.

Embodiment 12. The method of embodiment 11, wherein the vector is a system call rate, an access scheme, or a target list or combination thereof.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

Embodiment 13. A system comprising a processor and memory configured to perform the operations, methods, or processes, or any portion of any of these, or any combination thereof disclosed herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
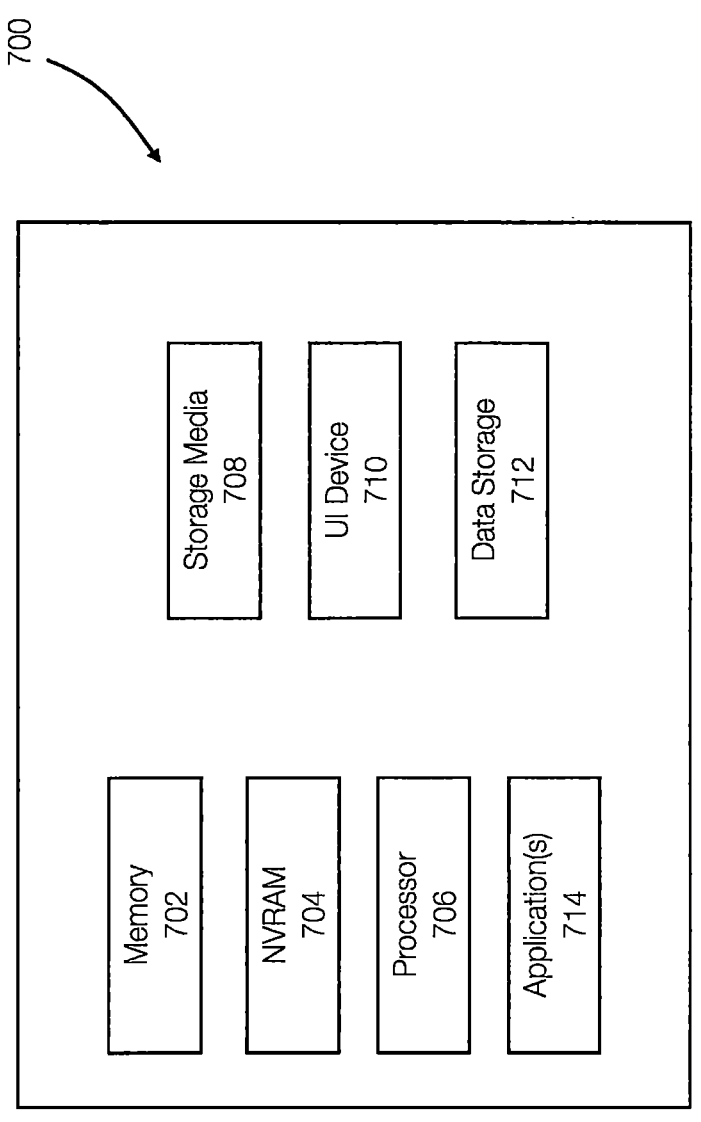
FIG. 7 discloses aspects of a computing device, a computing system, and/or a computing entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random-access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   categorizing files of a computing system, by the computing system, into one or more categories including a first category, wherein categorizing the files includes identifying, based on file attributes, files that are predictively valuable to ransomware or other malware processes, wherein the computing system identifies first files from among the files that belong to the first category, wherein the computing system determines that the first files are likely targets of a malicious process based on the file attributes indicating sensitivity or value to a malicious process;
   monitoring system calls made to an operating system kernel from a process operating in a user space of a computing system, wherein monitoring includes detecting system calls directed to the first files in the first category;
   determining a system call rate of the system calls issued by the process, wherein the system call rate comprises a rate at which the process issues file-access system calls directed to the first category of files;
   determining that the system call rate is anomalous in the computing system based on the system call rate to the first category exceeding an expected rate associated with non-malicious processes; and
   performing a protection operation when the process is determined to be a malicious process based on the system call rate being anomalous with respect to accesses directed to the first category of files.

2. The method of claim 1, wherein the system call rate is a first system call rate for all files in the computing system or is a second system call rate for the first category of files in the computing system.

3. The method of claim 2, wherein the system call rate is a combination of the first system call rate and the second system call rate.

4. The method of claim 1, wherein the first category includes files whose attributes indicate that the files include financial data, personal data, confidential data, or combination thereof.

5. The method of claim 2, further comprising determining the first system call rate and the second system call rate with regard to a time window.

6. The method of claim 5, further comprising varying a size of the time window.

7. The method of claim 1, further comprising determining that the process is anomalous when the system call rate exceeds a threshold system call rate.

8. The method of claim 1, further comprising determining that the process is anomalous when the system call rate is statistically anomalous in the context of system call rates associated with other processes operating in the user space.

9. The method of claim 1, wherein the system calls are directed to files, databases, and/or other data types.

10. A non-transitory storage medium having stored therein instructions that are executable by one or more hardware processors to perform operations comprising:

categorizing files of a computing system, by the computing system, into one or more categories including a first category, wherein the computing system identifies first files from among the files that belong to the first category, wherein the computing system determines that the first files are predictively valuable to ransomware or other malware processes based on file attributes indicating sensitivity or likely targeting by malware processes;

monitoring system calls made to an operating system kernel from a process operating in a user space of a computing system, including detecting system calls directed to the first files in the first category;

determining a system call rate of the system calls issued by the process, including determining a rate at which the process issues file-access system calls directed to the first category of files;

determining that the system call rate is anomalous in the computing system based on the rate of system calls directed to the first category of files exceeding an expected rate associated with non-malicious processes; and performing a protection operation when the process is determined to be a malicious process based on the system call rate being anomalous with respect to the accesses directed to the first category of files.

11. The non-transitory storage medium of claim 10, wherein the system call rate is a first system call rate for all files in the computing system or is a second system call rate for a first category of files in the computing system.

12. The non-transitory storage medium of claim 11, wherein the system call rate is a combination of the first system call rate and the second system call rate.

13. The non-transitory storage medium of claim 11, wherein the first category includes files whose attributes indicate that the files include financial data, personal data, confidential data, or combination thereof.

14. The non-transitory storage medium of claim 11, further comprising determining the first system call rate and the second system call rate with regard to a time window.

15. The non-transitory storage medium of claim 14, further comprising varying a size of the time window.

16. The non-transitory storage medium of claim 10, further comprising determining that the process is anomalous when the system call rate exceeds a threshold system call rate.

17. The non-transitory storage medium of claim 10, further comprising determining that the process is anomalous when the system call rate is statistically anomalous in the context of system call rates associated with other processes operating in the user space.

18. A method comprising:

categorizing files of a computing system, by the computing system, into one or more categories including a first category, wherein the computing system identifies first files from among the files that belong to the first category, wherein the computing system determines that the first files are predictively valuable to ransomware or other malware processes based on file attributes indicating sensitivity or likely malware targeting by malware processes;

monitoring a vector associated with a process operating in a user space of a computing system, wherein the vector comprises a system-call-rate vector representing file-access system calls made to an operating system kernel and directed to the first category of files;

determining that the vector associated with the process is anomalous based on an abnormal rate of system calls directed to the first category of files relative to expected non-malicious file-access patterns;

performing a protection operation when the process is determined to be a malicious process based on the vector being anomalous with respect to accesses directed to the first category of files.

19. The method of claim 18, wherein the vector is a system call rate, an access scheme, or a target list or combination thereof.

*    *    *    *    *